US012746648B2

(12) United States Patent
Chuang

(10) Patent No.: US 12,746,648 B2
(45) Date of Patent: Sep. 29, 2026

(54) RATCHET WRENCH INCLUDING A BICYCLE TOOLSET COMBINED THEREWITH CROSS-REFERENCE

(71) Applicant: Louis Chuang, Taichung (TW)

(72) Inventor: Louis Chuang, Taichung (TW)

( * ) Notice: Subject to any disclaimer, the term of this patent is extended or adjusted under 35 U.S.C. 154(b) by 31 days.

(21) Appl. No.: 19/057,390

(22) Filed: Feb. 19, 2025

(65) Prior Publication Data

US 2025/0187156 A1 Jun. 12, 2025

Related U.S. Application Data

(62) Division of application No. 17/939,046, filed on Sep. 7, 2022, now Pat. No. 12,257,674.

(30) Foreign Application Priority Data

Oct. 21, 2021 (TW) ................................ 110139123

(51) Int. Cl.
*B25B 27/00* (2006.01)
*B25B 13/46* (2006.01)
*B25B 27/22* (2006.01)

(52) U.S. Cl.
CPC .......... *B25B 27/0071* (2013.01); *B25B 13/46* (2013.01); *B25B 27/22* (2013.01)

(58) Field of Classification Search
CPC ..... B25B 27/0071; B25B 27/22; B25B 13/46; B25B 1/00; B25F 1/00; B25G 1/085
See application file for complete search history.

(56) References Cited

U.S. PATENT DOCUMENTS

| | | | | |
|---|---|---|---|---|
| 2,826,893 A | 3/1958 | Falk | B25B 27/22 254/100 |
| 8,555,609 B1 | 10/2013 | Chamberlain et al. | |
| 9,770,820 B1 | 9/2017 | Ragner | B25F 1/003 |
| 10,562,162 B2 | 2/2020 | Ichikawa | |
| 2004/0125609 A1 * | 7/2004 | Gilligan | B60B 29/00 362/486 |
| 2005/0078480 A1 | 4/2005 | Xingguo | B25B 13/56 362/253 |
| 2016/0311106 A1 | 10/2016 | Chuang | B25B 23/12 |
| 2018/0141396 A1 * | 5/2018 | Kerner | B60C 25/16 |
| 2021/0101266 A1 * | 4/2021 | Gu | B25H 3/006 |

FOREIGN PATENT DOCUMENTS

| | | | |
|---|---|---|---|
| CN | 101396822 A | 4/2009 | |
| CN | 204135951 U | 2/2015 | |
| TW | 444703 U | 7/2001 | |
| TW | I406789 B | 9/2013 | |
| TW | I471203 B | 2/2015 | |
| TW | I572455 B | 3/2017 | |
| TW | M615872 U | 8/2021 | |
| WO | WO-2023006444 A1 | 2/2023 | B25B 13/46 |

* cited by examiner

*Primary Examiner* — C. A. Rivera
(74) *Attorney, Agent, or Firm* — MUNCY, GEISSLER, OLDS & LOWE, P.C.

(57) ABSTRACT

A ratchet wrench including a bicycle toolset combined therewith includes a main body with a ratchet drive head and an accommodating cavity. A detachable toolset is housed within the cavity and includes a connector, plug, and inflator adapter. The inflator adapter provides an air channel for inflating purposes, ensuring lightweight, multifunctional usability.

8 Claims, 8 Drawing Sheets

RATCHET WRENCH INCLUDING A BICYCLE TOOLSET COMBINED THEREWITH CROSS-REFERENCE

CROSS-REFERENCE

This application is a divisional application of U.S. application Ser. No. 17/939,046, filed on Sep. 7, 2022, which is now allowed, and is hereby incorporated by reference in its entirety.

BACKGROUND OF THE INVENTION

The present invention relates to a ratchet wrench and, particularly, to a ratchet wrench including a bicycle toolset combined therewith.

TW U.S. Pat. No. 1,471,203 shows a multifunctional toolset for bicycles. The tool includes a body which has a first side, a side opposite to the first side, and an outer peripheral edge between the first and the second sides. The body is recessed and forms at least one groove that creates a space for avoiding contact. The at least one groove is adjacent to the outer peripheral edge of the body. The portion of the at least one groove close to the first side of the body and both sides of the outer peripheral edge are open. The portion of the at least one groove close to the second side of the body has a shielding wall. The shielding wall close the side of the at least one groove which is close to the second side. At least one working head is pivotally connected to the body and engaged in the at least one groove. The end of the at least one working head pivotally connected to the body is in a shape of a flat plate. The at least one working head is movable relative to the body and selectively protrudes from the outer peripheral edge of the body outside the at least one groove.

Bicycles are commonly used as a means of transportation for sports or travel and leisure, and in order to avoid user's burden, bicycle tools are often small in size, light in weight and multi-functional. Thus, the type or the shape of the bicycle tools are often limited. For example, a ratchet wrench, is more convenient for use than a wrench, however, it is larger in size and heavier than the wrench. Therefore, it is difficult to design a ratchet wrench combined with bicycle tools.

The present invention is, therefore, intended to obviate or at least alleviate the problems encountered in the prior art.

SUMMARY OF THE INVENTION

The present invention provides a ratchet wrench including a bicycle toolset combined therewith. The ratchet wrench comprises a main body having a first end including a ratchet drive head and a second end including an accommodating cavity. The toolset is detachably connected to the main body and comprises a connector, a plug, and an inflator adapter. The connector has a first connecting portion and a second connecting portion at different ends, a plug, and an inflator adapter including a coupling end and an inflator end at different ends. When the toolset is in a combination configuration, the connector, plug, and inflator adapter are coupled together. The first connecting portion is detachably fastened to the main body and disposed in the accommodating cavity. The plug is connected to the first connecting portion and positioned in the cavity. The second connecting portion is inserted into an air channel of the inflator adapter, with the air channel extending from the coupling end to the inflator end.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the concept upon which this disclosure is based may readily be utilized as a basis for designing other structures, methods, and systems for carrying out the several purposes of the invention. It is important, therefore, that the claims be regarded as including such equivalent constructions insofar as they do not deviate from the spirit and scope of the invention.

Furthermore, the purpose of the abstract is to enable the general public, particularly scientists, engineers, and practitioners in the field who may not be familiar with patent or legal terminology, to quickly determine the nature and essence of the technical information through a brief examination. The abstract is not meant to define the invention, which is determined by the claims, nor is it intended to limit the scope of the invention in any manner.

Other objectives, advantages, and new features of the invention will become apparent from the following detailed description of the invention when considered in conjunction with the accompanied drawings.

DETAILED DESCRIPTION OF THE INVENTION

Figure 1:
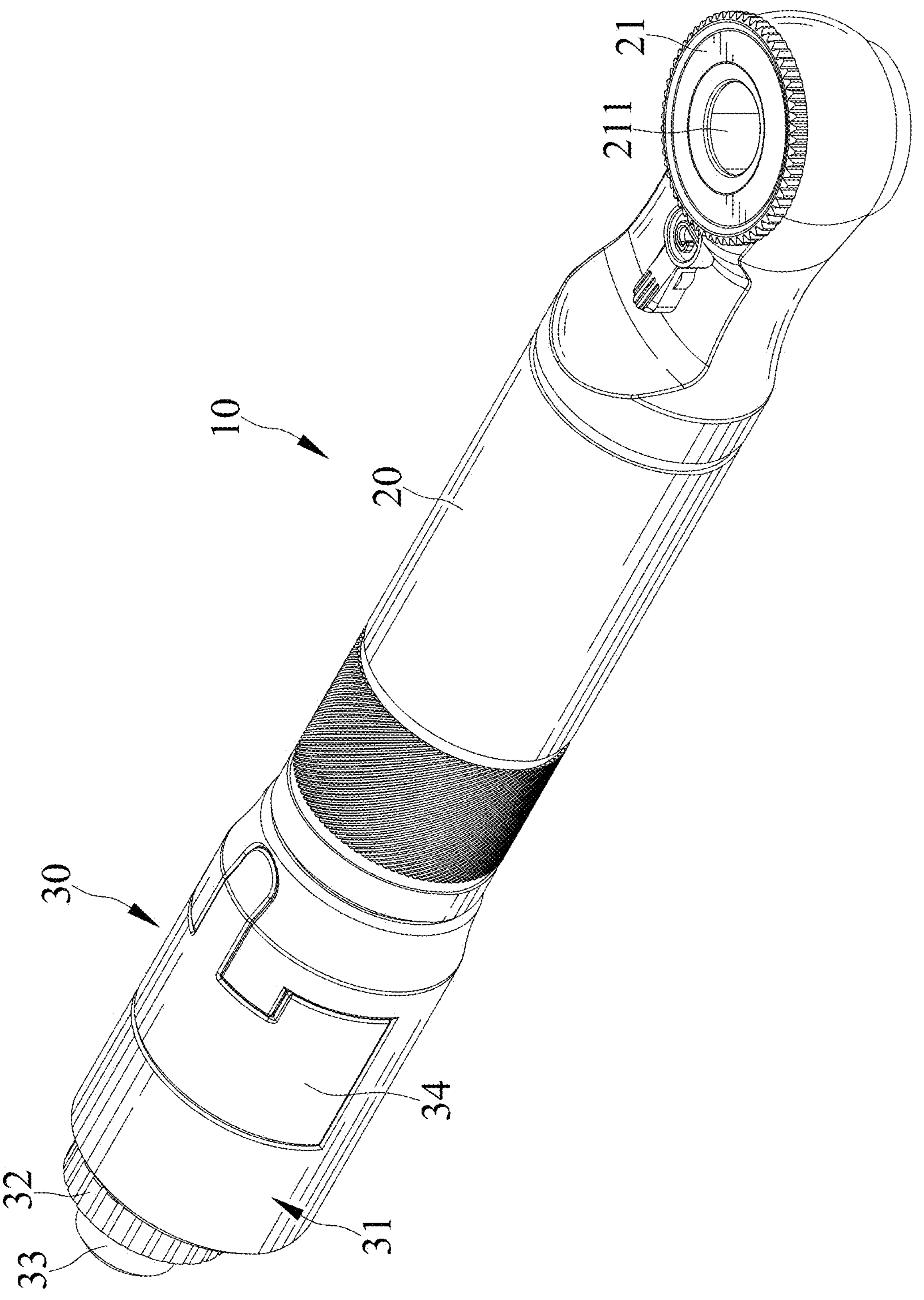
FIG. 1 is a perspective view of a ratchet wrench including a bicycle toolset combined therewith in accordance with a first embodiment of the present invention.
Figure 2:
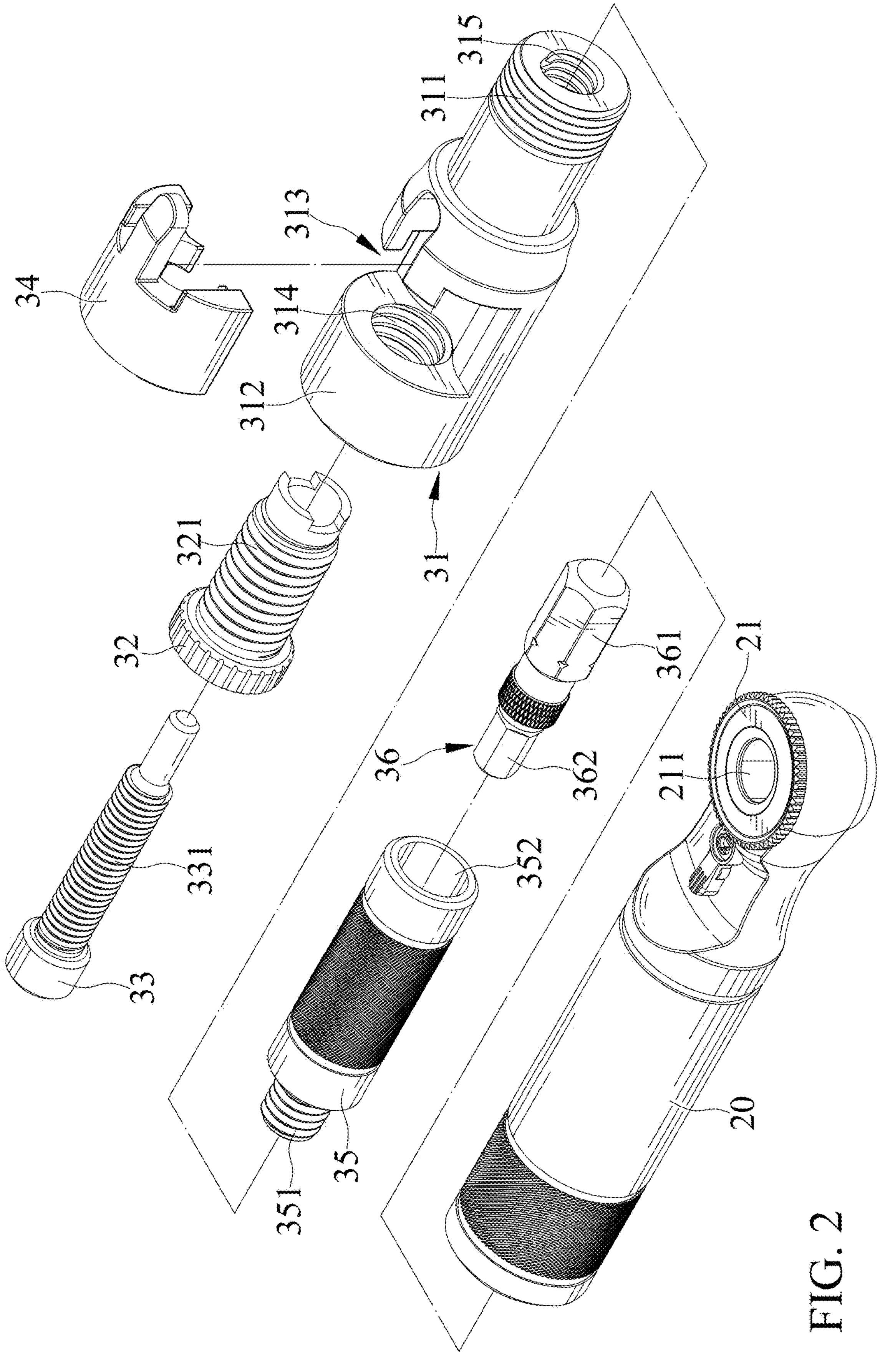
FIG. 2 is an exploded perspective view of the ratchet wrench of FIG. 1.
Figure 3:
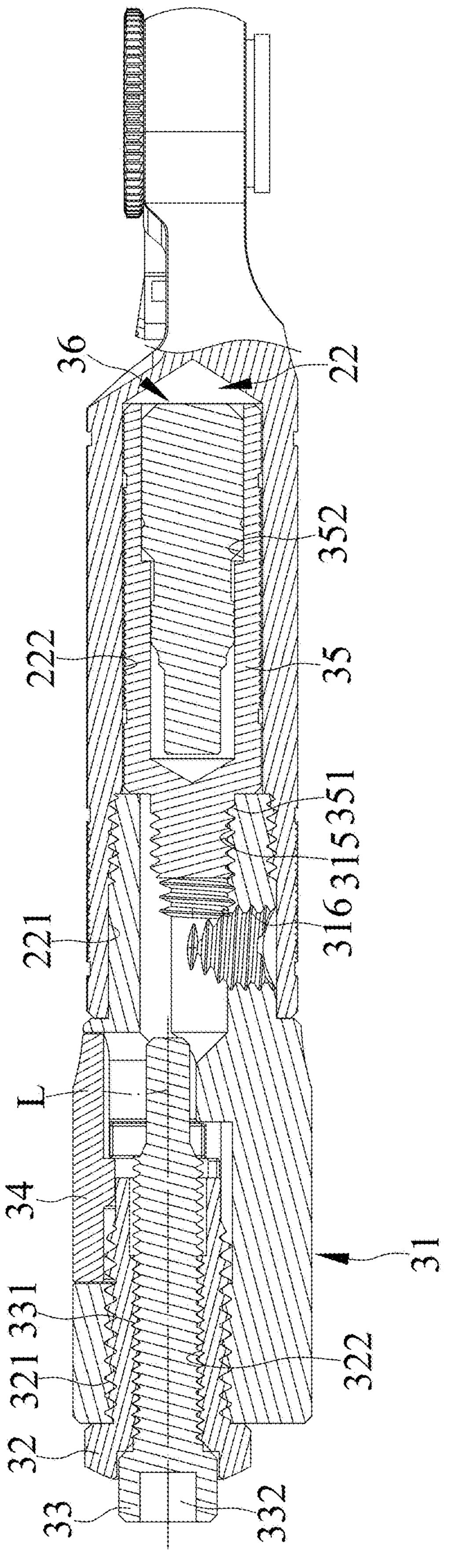
FIG. 3 is a cross-sectional view of the ratchet wrench of FIG. 1.
Figure 4:
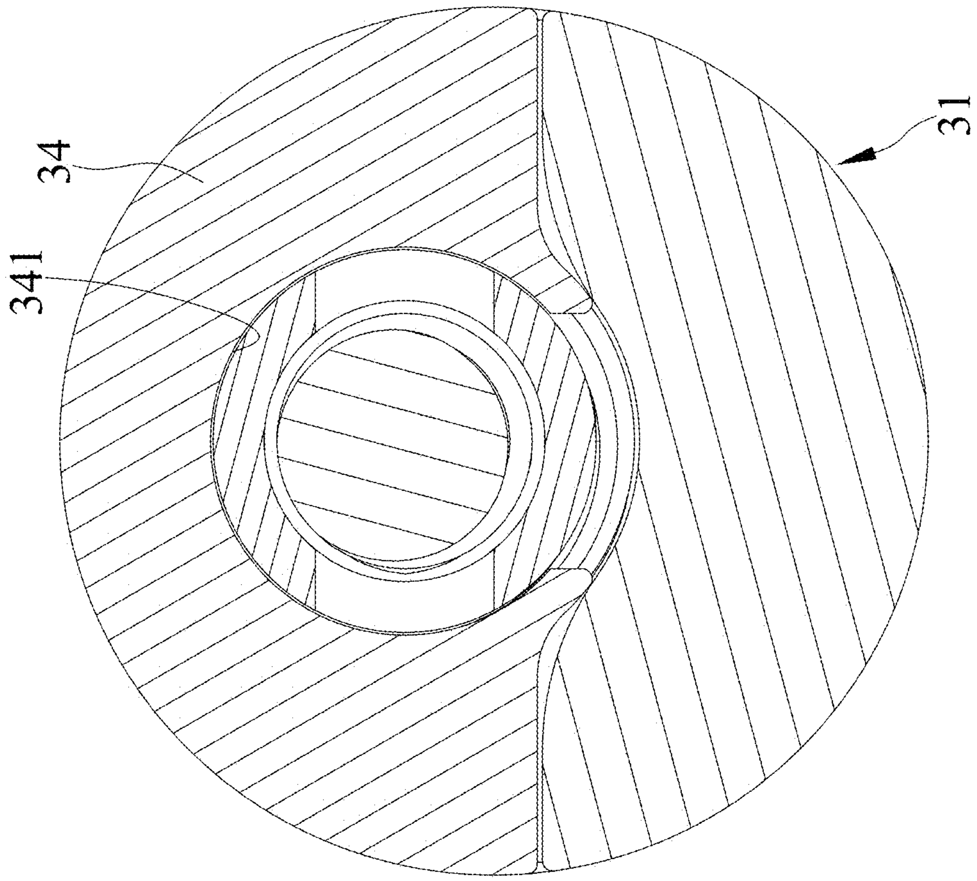
FIG. 4 is another cross-sectional view of the ratchet wrench of FIG. 1.
Figure 5:
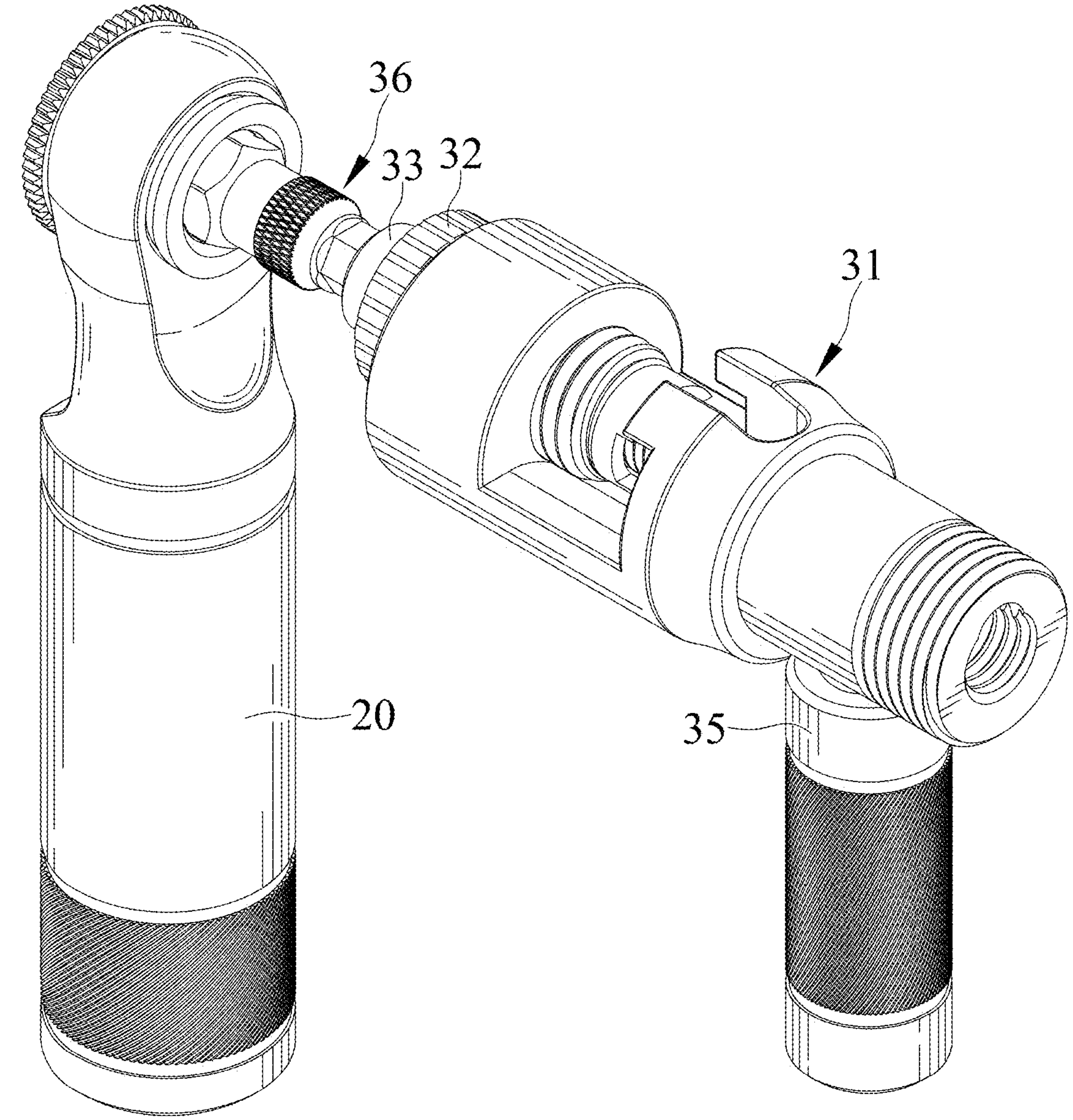
FIG. 5 is a perspective view of the ratchet wrench of FIG. 1 in a configuration in which a bicycle tool is assembled for an operation.

FIGS. 1 through 5 show a ratchet wrench 10 including a bicycle toolset 30 combined therewith in accordance with a first embodiment of the present invention. The ratchet wrench 10 has a main body 20 which has a first end including a ratchet drive head 21 and a second end including an accommodating cavity 22. The accommodating cavity 22 has a first section 221 and a second section 222. The first section 221 is adjacent to an open end of the accommodating cavity 22. The second section 222 is connected to the first section 221 and adjacent to the ratchet drive head 21.

The toolset 30 in a combination configuration is detachably connected to the main body 20 and includes a length disposed in the accommodating cavity 22. The toolset 30 comprises at least one bicycle tool. The toolset 30 is a chain tool which includes a chain tool body 31, a body bolt 32, and an extractor bolt 33. The chain tool body 31 includes a first connecting hole 315 and a second connecting hole 316. The first connecting hole 315 extends along a central axis L. The second connecting hole 316 extends in a direction radial to the central axis L and opens on an outer peripheral edge of the chain tool body 31. The chain tool body 31 has a first connecting portion 311, a second connecting portion 312, and a working area 313 between the first and the second connecting portions 311 and 312. The first connecting hole 315 extends in the first connecting portion 311. The first connecting portion 311 is detachably connected to the main body 20 and disposed in the accommodating cavity 22 when the toolset 30 is in the combination configuration. Specifically, the first connecting portion 311 and the first section 221 are detachably connected with each other when the toolset 30 is in the combination configuration. The first connecting portion 311 and the first section 221 have threads adapted to be detachably engaged with each other. The second connecting portion 312 and the working area 313 are disposed outside the accommodating cavity 22 when the toolset 30 is in the combination configuration. The second connecting portion 312 includes first internal threads 314 extending axially along the central axis L and the body bolt 32 includes first external threads 321 engaged with the first internal threads 314. The body bolt 32 is movable in the working area 313 toward or away from the first connecting portion 311. The body bolt 32 includes second internal threads 322 extending along the central axis L and having a diameter smaller than the first external threads 321. The extractor bolt 33 is engaged with the body bolt 32. The extractor bolt 33 includes second external threads 331 engaged with the second internal threads 322. The extractor bolt 33 is movable in the working area 313 toward or away from the first connecting portion 311.

Further, the toolset 30 includes a closure 34 detachably connected to the chain tool body 31 and configured to enclose the working area 313 and a grip 35 selectively connectible to the chain tool body 31 in a first configuration and a second configuration. When the closure 34 encloses the working area 313, it has a limiting portion 341 configured to limit a movement of the body bolt 32, and the body bolt 32 includes an end adjacent to the working area 313 abutting the limiting portion 341. The grip 35 has a joining portion 351 detachably connectible to the chain tool body 31. The grip 35 in the first configuration includes the joining portion 351 detachably connected to the first connecting hole 315. The grip 35 in the first configuration is adapted to be disposed within the accommodating cavity 22 when the toolset 30 is in the combination configuration. When the toolset 30 is in not in the combination configuration and includes the second connecting hole 316 disposed outside the accommodating cavity 22, the grip 35 is connectible to the chain tool body 31 in the second configuration.

Moreover, the toolset 30 includes a driver bit 36 selectively positionable in a first position and a second position. The driver bit 36 in the first position is inserted in a cavity 352 in the grip 35. The driver bit 36 is adapted to be arranged in the first position when the grip 35 is in the first configuration. The driver bit 36 in the second position includes a first driving end 361 detachably fastened to the ratchet drive head 21 and a second driving end 362 detachably fastened to the extractor bolt 33. Specifically, the ratchet drive head 21 includes the first driving portion 211 to which a driving tool is adapted to couple, and the extractor bolt 33 includes the second driving portion 332 to which a driving tool is adapted to couple.

Figure 6:
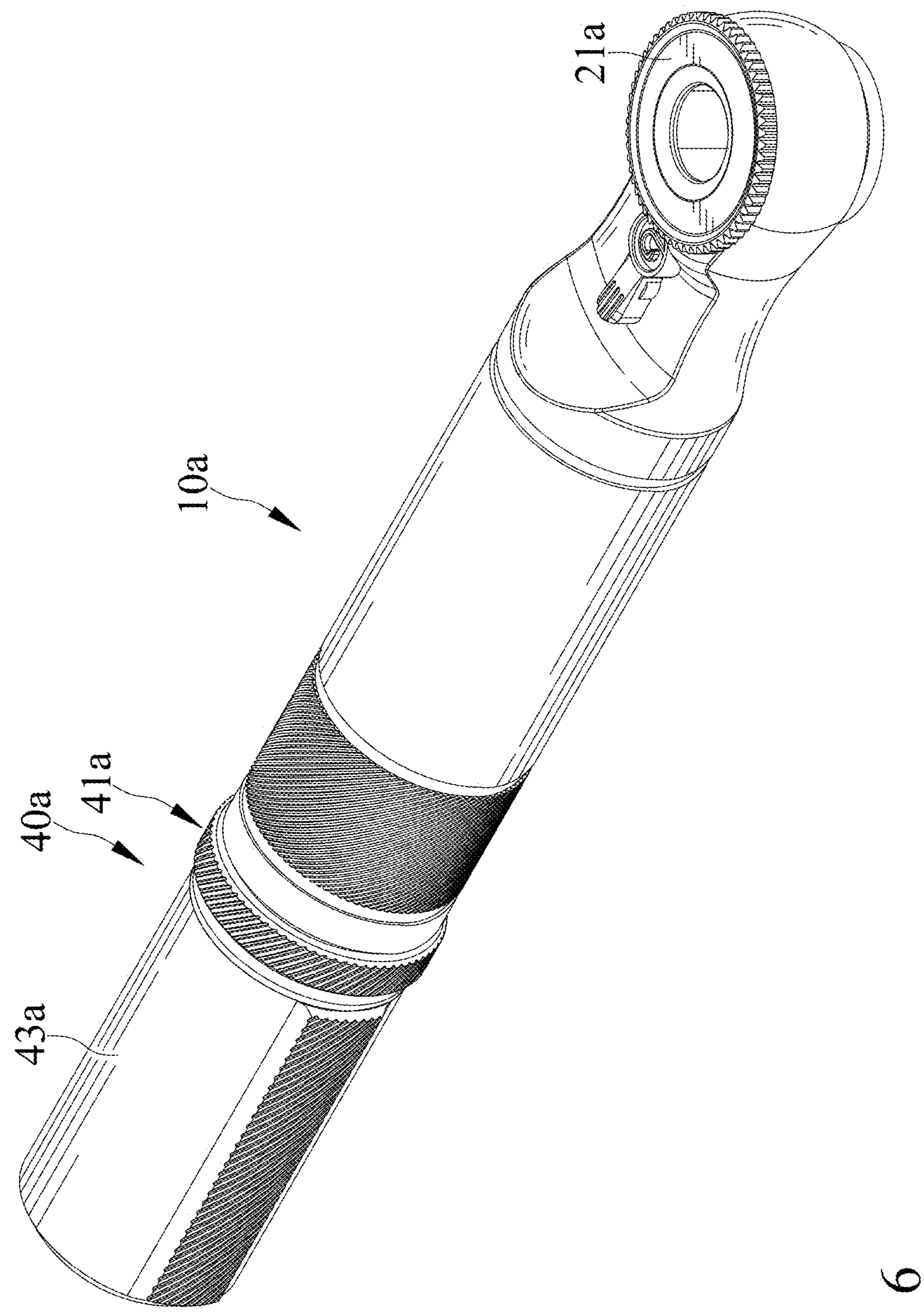
FIG. 6 is a perspective view of a ratchet wrench including a bicycle toolset combined therewith in accordance with a second embodiment of the present invention.
Figure 7:
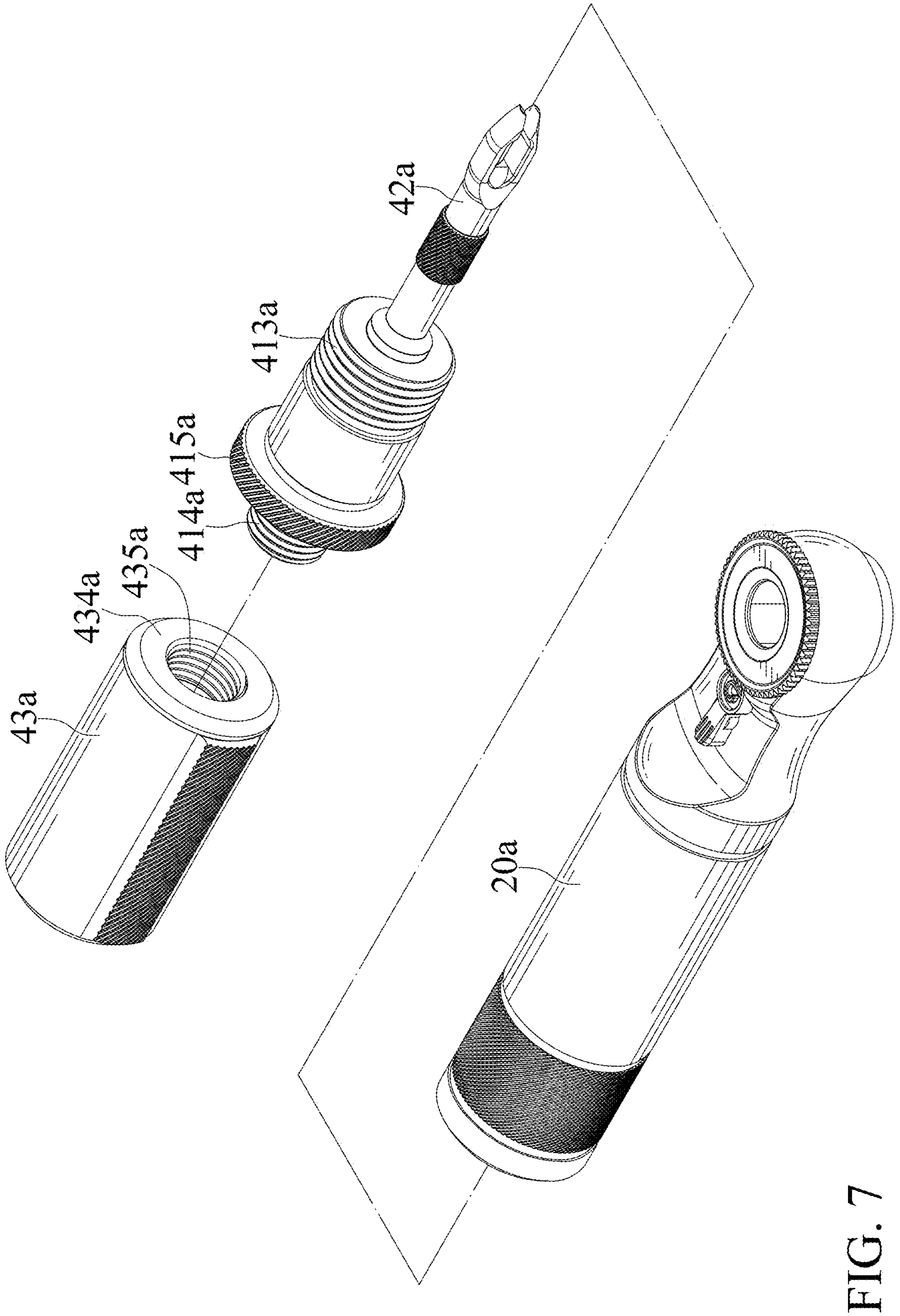
FIG. 7 is an exploded perspective view of the ratchet wrench of FIG. 6.
Figure 8:
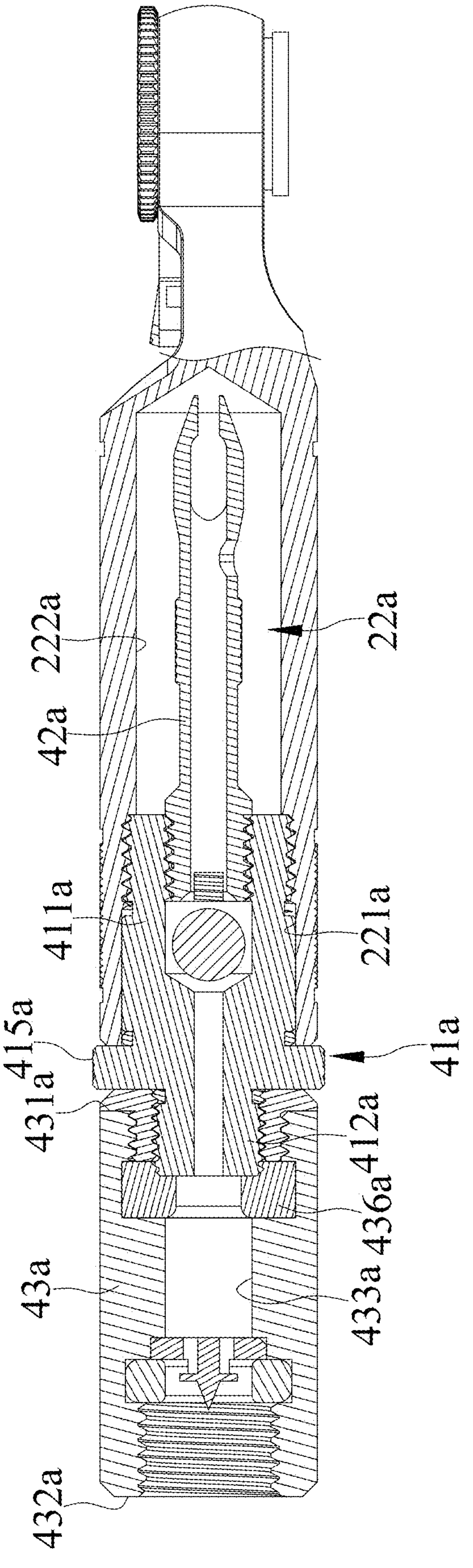
FIG. 8 is a cross-sectional view of the ratchet wrench of FIG. 6.

FIGS. 6 through 8 show a ratchet wrench 10*a* including a bicycle toolset 40*a* combined therewith in accordance with a second embodiment of the present invention, and the same numbers are used to correlate similar components of the first embodiment, but bearing a letter a. The ratchet wrench 10*a* has a main body 20*a* which has a first end including a ratchet drive head 21*a* and a second end including an accommodating cavity 22*a*. The accommodating cavity 22*a* has a first section 221*a* and a second section 222*a*. The first section 221*a* is adjacent to an open end of the accommodating cavity 22*a*. The second section 222*a* is connected to the first section 221*a* and adjacent to the ratchet drive head 21*a*. The second embodiment is different from the first embodiment in that a toolset 40*a* is different from the toolset 30.

The toolset 40*a* includes a connector 41*a*, a plug 42*a*, and an inflator adapter 43*a*. The connector 41*a* has a first connecting portion 411*a* and a second connecting portion 412*a* at different ends. The inflator adapter 43*a* includes a coupling end 431*a* and an inflator end 432*a* at different ends. When the toolset 40*a* is in the combination configuration, the connector 41*a* and the plug 42*a* and the inflator adapter 43*a* are coupled with one another, the first connecting portion 411*a* is detachably fastened to the main body 20*a* and disposed in the accommodating cavity 22*a*, the plug 42*a* is connected to the first connecting portion 411*a* and disposed in the accommodating cavity 22*a*, and the coupling end 431*a* is detachably connected to the second connecting portion 412*a*. Specifically, the first connecting portion 411*a* and the first section 221*a* are detachably connected with each other and the plug 42*a* is inserted in the second section 222*a*. The inflator end 432*a* is connectible to an inflator (not shown) which is useful for supplying air to the inflator adapter 43*a*. The inflator adapter 43*a* has an air channel 433*a* communicating and extending from the coupling end 431*a* to the inflator end 432*a*. The air channel 433*a* includes an airtight ring 436*a* disposed therein. When the connector 41*a* and the inflator adapter 43*a* are coupled with each other, the second connecting portion 412*a* is inserted into the air channel 433*a* and abuts the airtight ring 436*a*, the connector 41*a* includes first external threads 413*a* on the first connecting portion 411*a* threadly engaged with an inner periphery of the accommodating cavity 22*a* and second external threads 414*a* on the second connecting portion 412*a* disposed outside the accommodating cavity 22*a*, and the coupling end 431*a* includes a connecting structure 434*a* having internal threads 435*a* and engaged with second external threads 414*a*. Additionally, the connector 41*a* includes a flange 415*a* extending radially outward from an outer periphery thereof. The flange 415*a* is disposed between the first and the second connecting portions 411*a* and 412*a*. When the toolset 40*a* is in the combination configuration, the main body 20*a* includes an end, which is opposite to the ratchet drive head 21*a*, abutting a first side of the flange 415*a*. When the connector 41*a* and the inflator adapter 43*a* are coupled with each other and the second connecting portion 412*a* is inserted into the air channel 433*a*, the inflator adapter 43*a* includes an end opposite to the inflator end 432*a* abutting a second side of the flange 415*a*.

In view of the foregoing, the ratchet wrench 10 and 10*a* include bicycle toolsets 30 and 40*a* combined therewith of the present invention have compact designs and therefore they are light in weight and easy to carry. Further, they help a user reduce the burden of carrying many bicycle tools.

The foregoing is merely illustrative of the principles of this invention, and various modifications can be made by those skilled in the art without departing from the scope and spirit of the invention.

The invention claimed is:

1. A ratchet wrench including a bicycle toolset combined therewith comprising:

a main body having a first end including a ratchet drive head and a second end including an accommodating cavity; and a toolset detachably connected to the main body in a combination configuration, wherein the toolset comprises a connector having a first connecting portion and a second connecting portion at different ends, a plug, and an inflator adapter including a coupling end and an inflator end at different ends;

wherein, in the combination configuration, the connector, the plug, and the inflator adapter are coupled with one another, the first connecting portion is detachably fastened to the main body and disposed in the accommodating cavity, the plug is connected to the first connecting portion and disposed in the accommodating cavity, the coupling end is detachably connected to the second connecting portion, the second connecting portion is inserted into an air channel of the inflator adapter, communicating and extending from the coupling end to the inflator end.

2. The ratchet wrench including the bicycle toolset combined therewith as claimed in claim 1, wherein the inflator end is connectible to an inflator for supplying air to the inflator adapter.

3. The ratchet wrench including the bicycle toolset combined therewith as claimed in claim 1, wherein the air channel includes an airtight ring disposed therein, and wherein when the connector and inflator adapter are coupled, the second connecting portion abuts the airtight ring.

4. The ratchet wrench including the bicycle toolset combined therewith as claimed in claim 1, wherein when the connector and the inflator adapter are coupled, the connector includes first external threads on the first connecting portion engaged with an inner periphery of the accommodating cavity, the connector includes second external threads on the second connecting portion disposed outside the accommodating cavity, and the coupling end includes a connecting structure with internal threads engaged with the second external threads.

5. The ratchet wrench including the bicycle toolset combined therewith as claimed in claim 3, wherein when the connector and the inflator adapter are coupled, the second connecting portion abuts the airtight ring.

6. The ratchet wrench including the bicycle toolset combined therewith as claimed in claim 1, wherein the accommodating cavity includes a first section adjacent to an open end of the accommodating cavity, and a second section connected to the first section and adjacent to the ratchet drive head, the first connecting portion and the first section being detachably connected, and the plug being inserted in the second section when the toolset is in the combination configuration.

7. The ratchet wrench including the bicycle toolset combined therewith as claimed in claim 1, wherein the connector includes a flange extending radially outward from an outer periphery thereof, and the flange disposed between the first and the second connecting portions.

8. The ratchet wrench including the bicycle toolset combined therewith as claimed in claim 7, wherein when the toolset is in the combination configuration, the main body includes an end opposite to the ratchet drive head abutting a first side of the flange, and when the connector and the inflator adapter are coupled and the second connecting portion is inserted into the air channel, the inflator adapter includes an end opposite to the inflator end abutting a second side of the flange.

* * * * *